E. S. NEWMAN.
COMBINED TYPE WRITING AND ADDING MACHINE.
APPLICATION FILED FEB. 7, 1901.

1,015,630.

Patented Jan. 23, 1912.

9 SHEETS—SHEET 6.

WITNESSES:
Wm. F. Doyle
E. A. Ryan

INVENTOR
Enos S. Newman,
By Chamberlain & Newman
Attorneys

E. S. NEWMAN.
COMBINED TYPE WRITING AND ADDING MACHINE.
APPLICATION FILED FEB. 7, 1901.

1,015,630.

Patented Jan. 23, 1912.
9 SHEETS—SHEET 9.

UNITED STATES PATENT OFFICE.

ENOS S. NEWMAN, OF WASHINGTON, DISTRICT OF COLUMBIA, ASSIGNOR, BY MESNE ASSIGNMENTS, TO BURROUGHS ADDING MACHINE COMPANY, OF DETROIT, MICHIGAN, A CORPORATION OF MICHIGAN.

COMBINED TYPE-WRITING AND ADDING MACHINE.

1,015,630.     Specification of Letters Patent.     Patented Jan. 23, 1912.

Application filed February 7, 1901. Serial No. 46,379.

*To all whom it may concern:*

Be it known that I, ENOS S. NEWMAN, a citizen of the United States, and resident of W..h.. igton, in the District of Columbia, have . ented certain new and useful Improvements in a Combined Type-Writing and Adding Machine, of which the following is a specification.

My invention relates to combined typewriting and adding machines and has for its object to provide typewriting mechanism and improved means for combining the same with adding mechanism.

Reference may be had to William S. Burroughs' Patent No. 505,078 as to standard printing devices employed in these machines.

As is well known to those skilled in the art, adding machines of the class mentioned are provided with key-boards and in their operation they print the several numbers to be added as well as the sum of said numbers.

A further object of the present invention is to provide special means for combining type writing mechanism with such an adding machine whereby, when the two machines are conjointly operated, the whole of a bill, statement, pay-roll, etc., except the column of numbers to be added and the total thereof, will be printed by the typewriting mechanism while the adding machine will perform in full the same work for which it is intended when operated independently.

A further object of the invention is to so construct combinable typewriting mechanism and its connections with the adding machine that they may be operated in the usual manner of such mechanisms and for their usual purposes, whether operated separately or jointly.

A further object of the invention is to generally improve the construction and operation of the typewriting mechanism and the means for combining it with an adding machine.

With these several objects in view my invention consists in the improved construction, arrangement, and combination of mechanisms hereinafter fully described, and afterward particularly specified in the claims.

Figure 1:
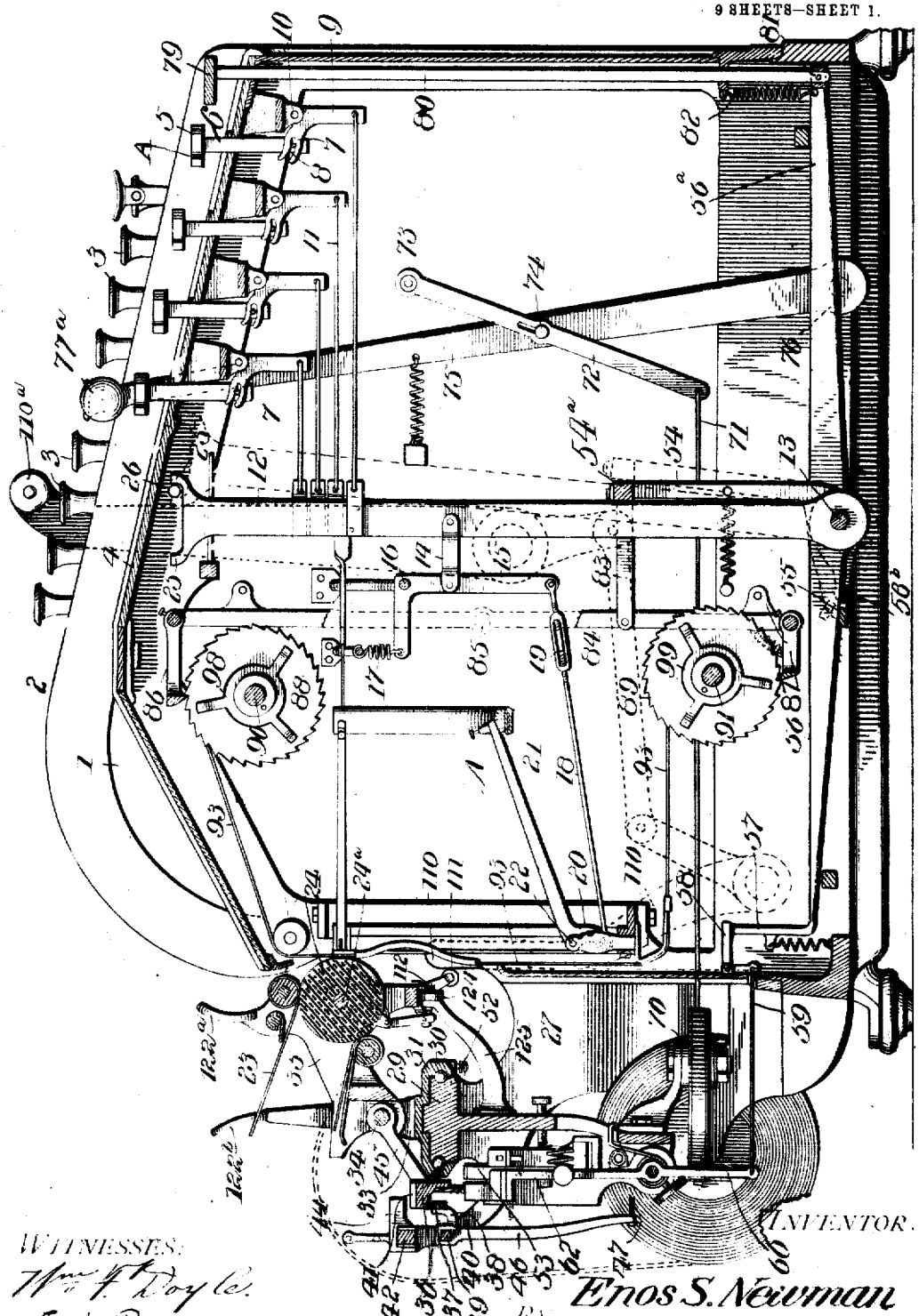
Figure 2:
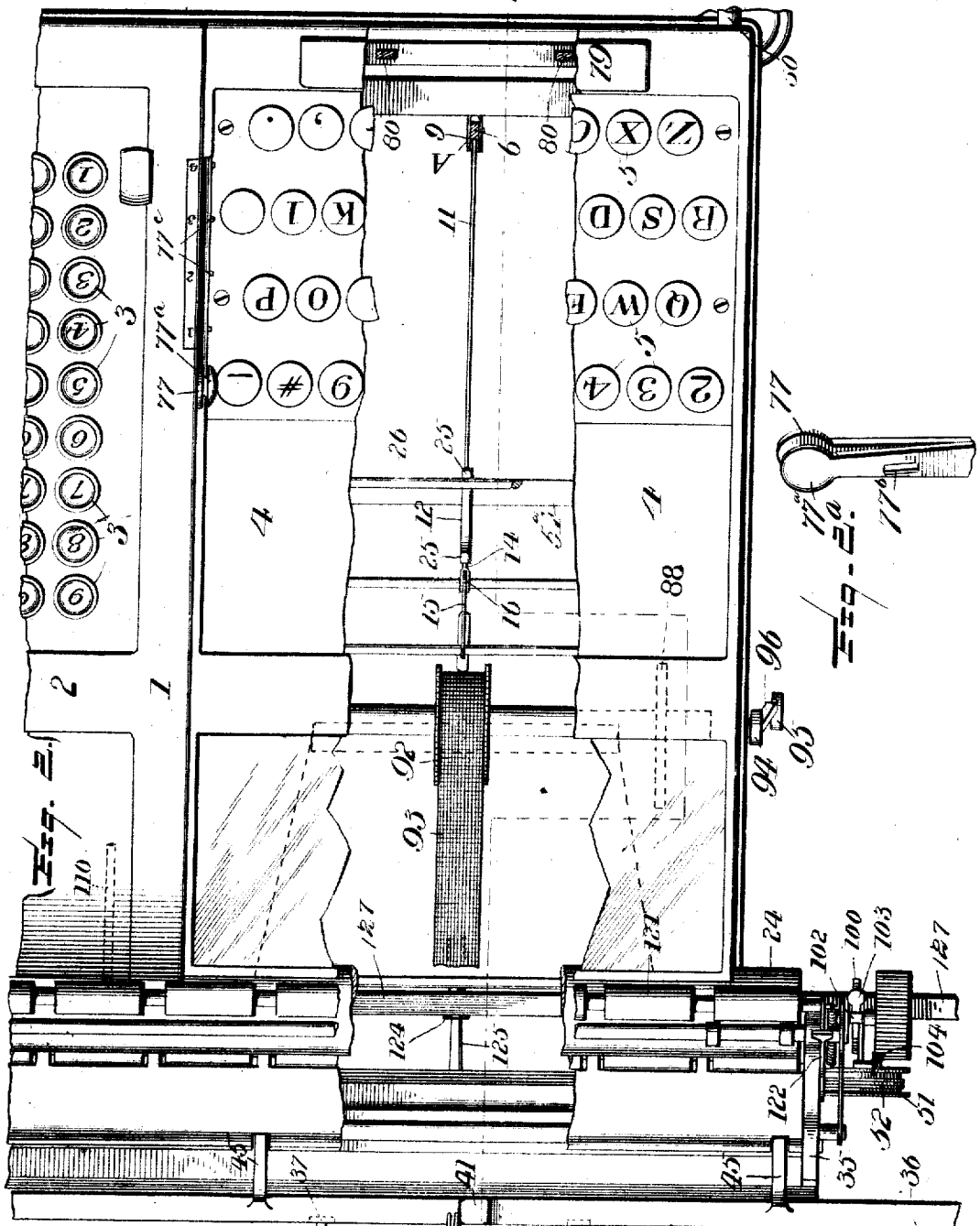
Figure 3:
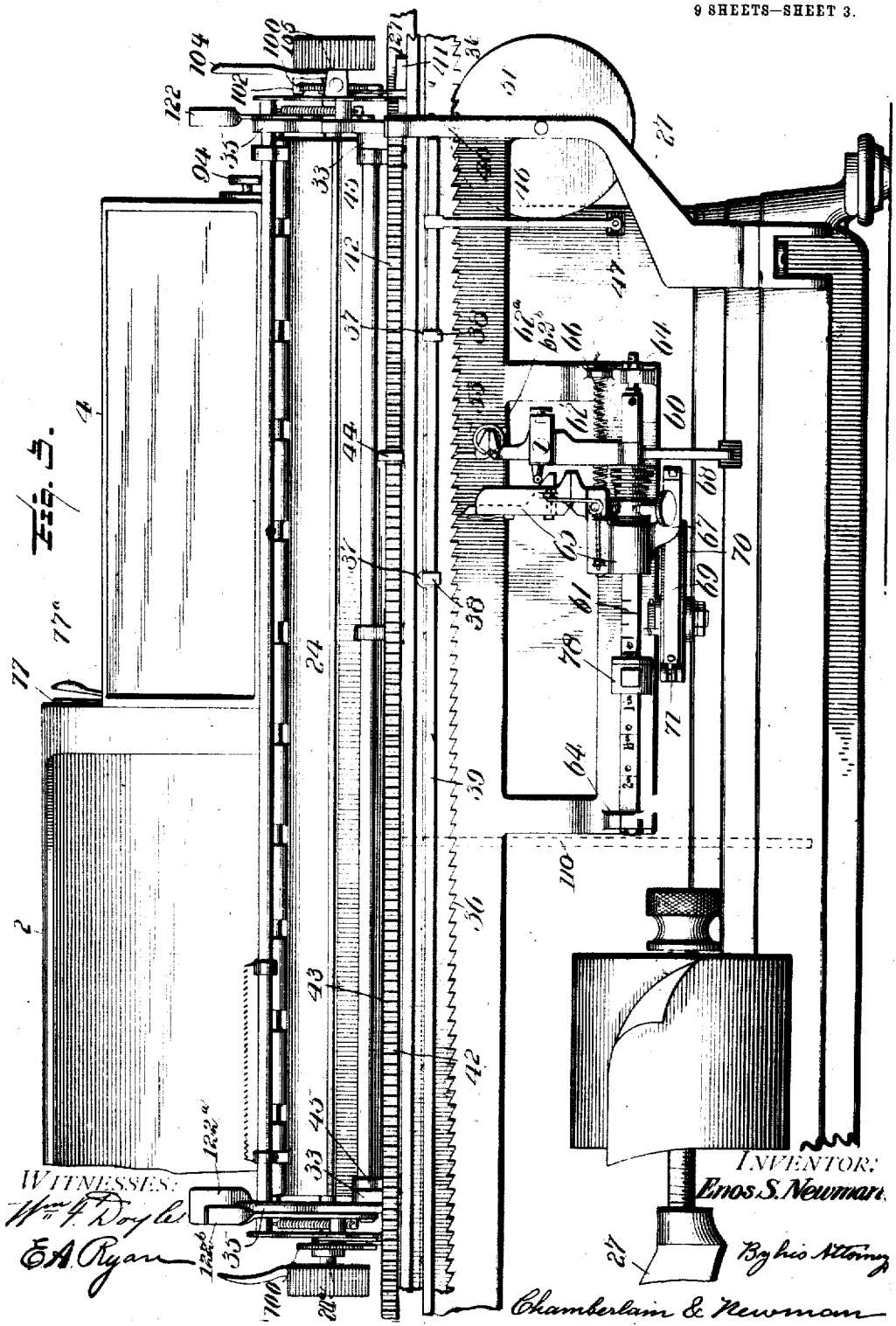
Figure 4:
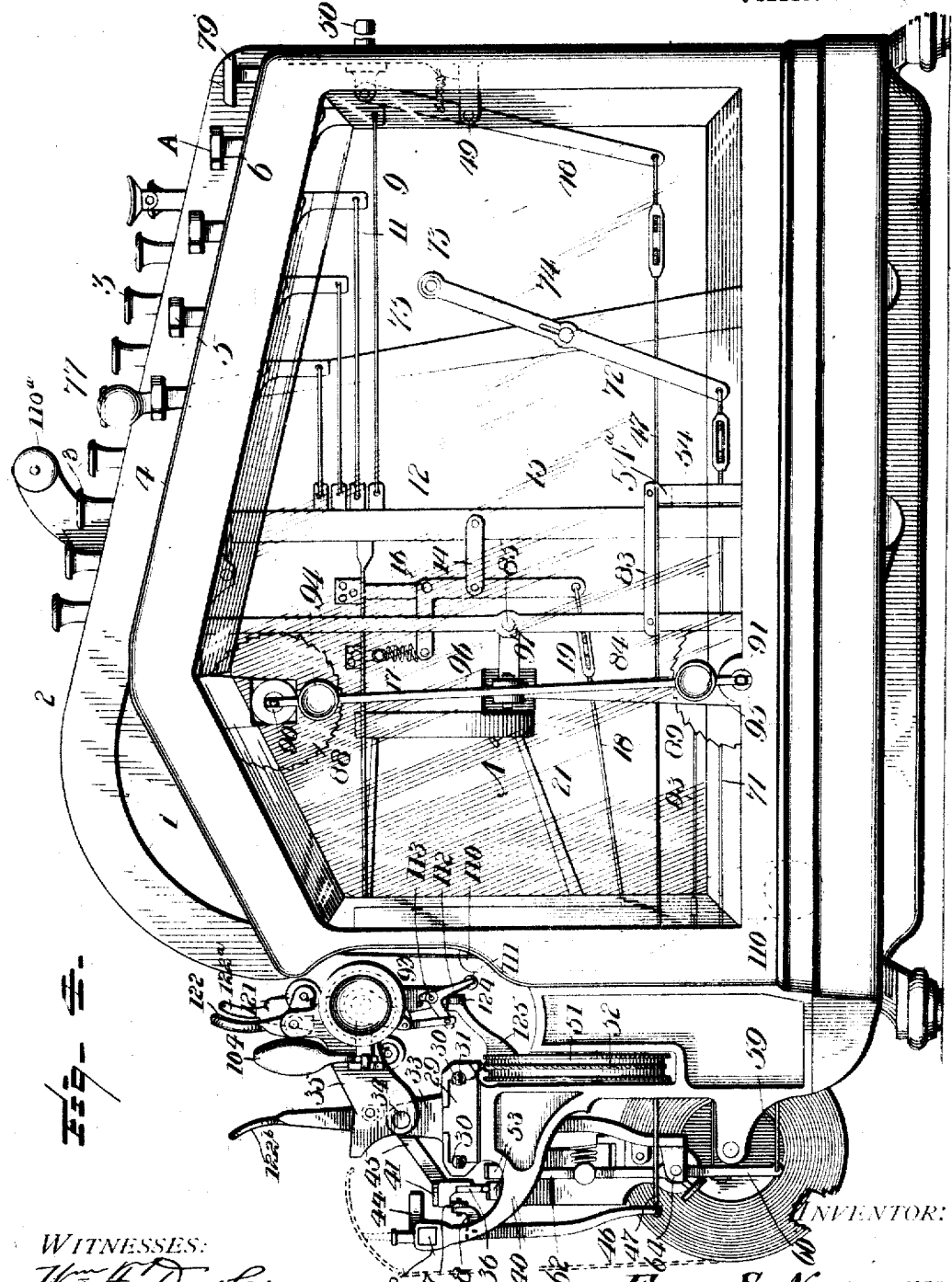
Figure 5:
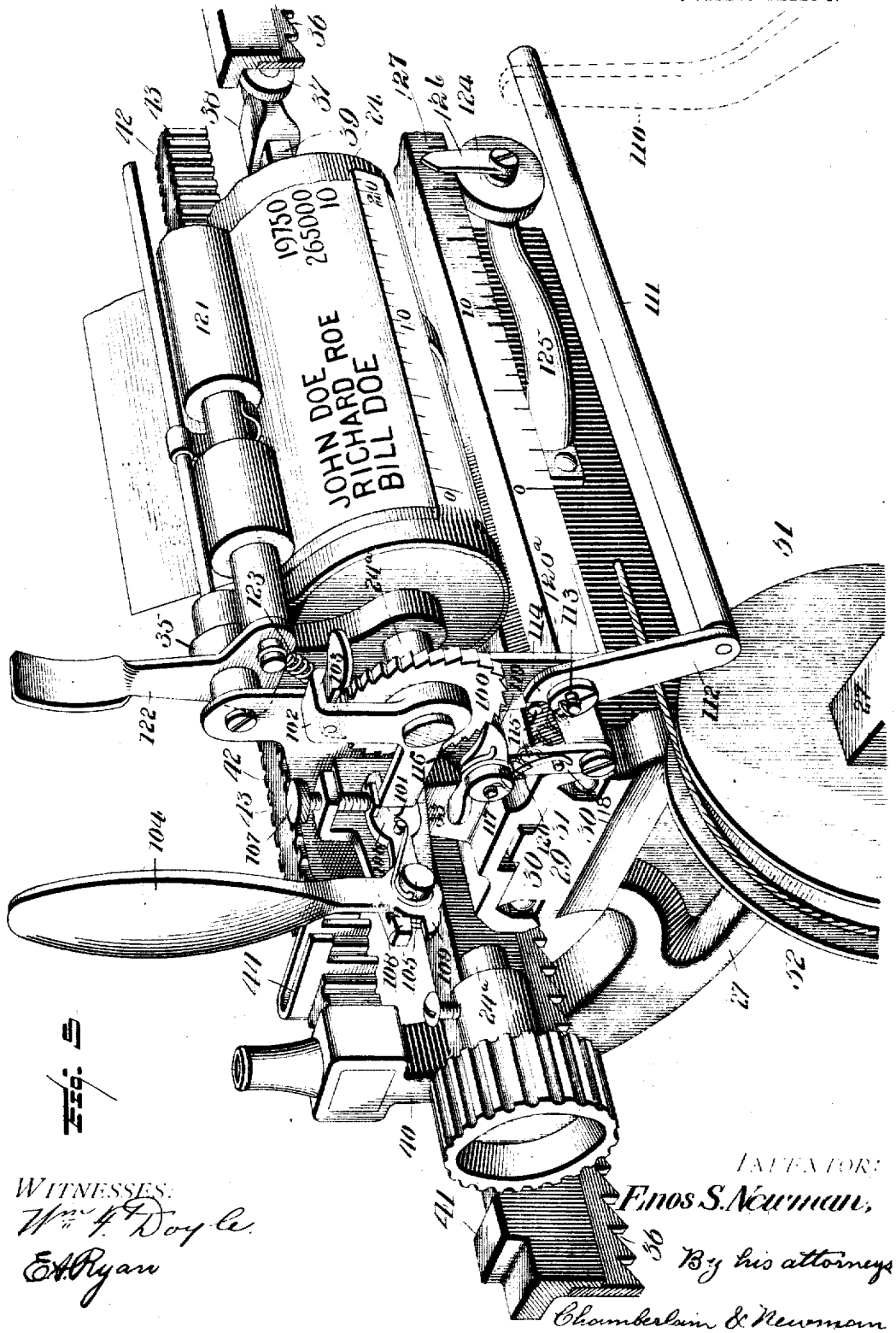
Figure 6:
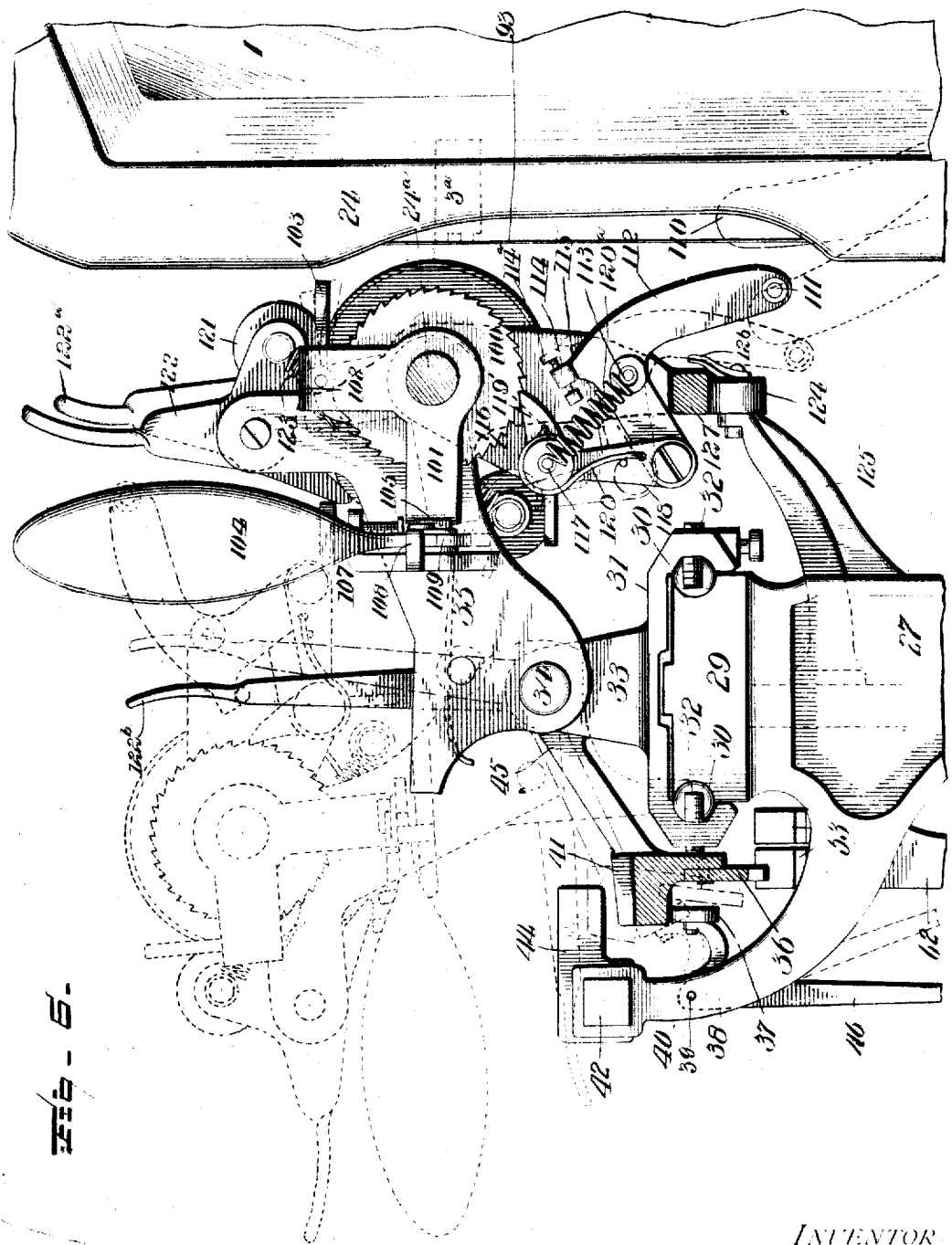
Figure 7:
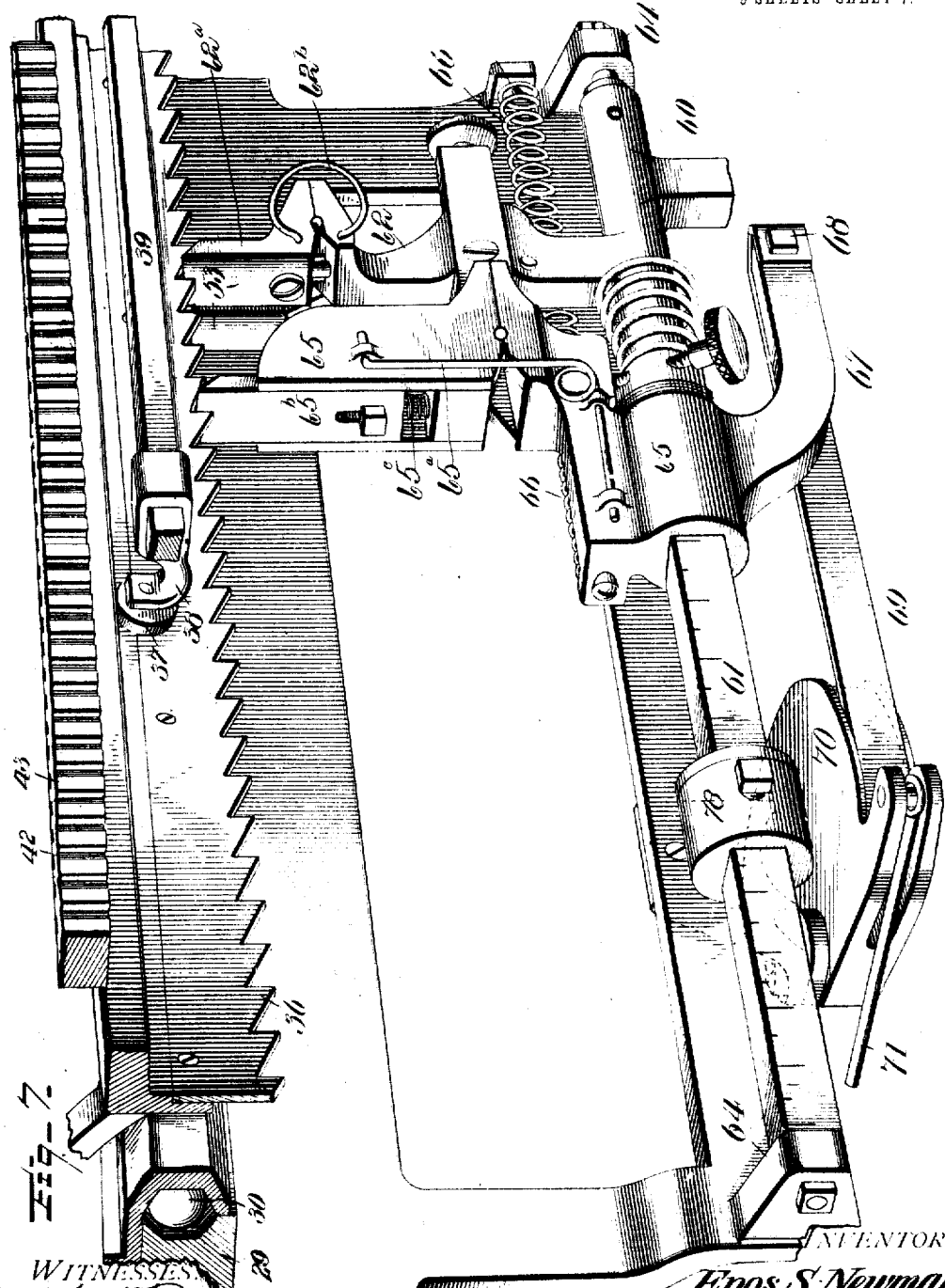
Figure 8:
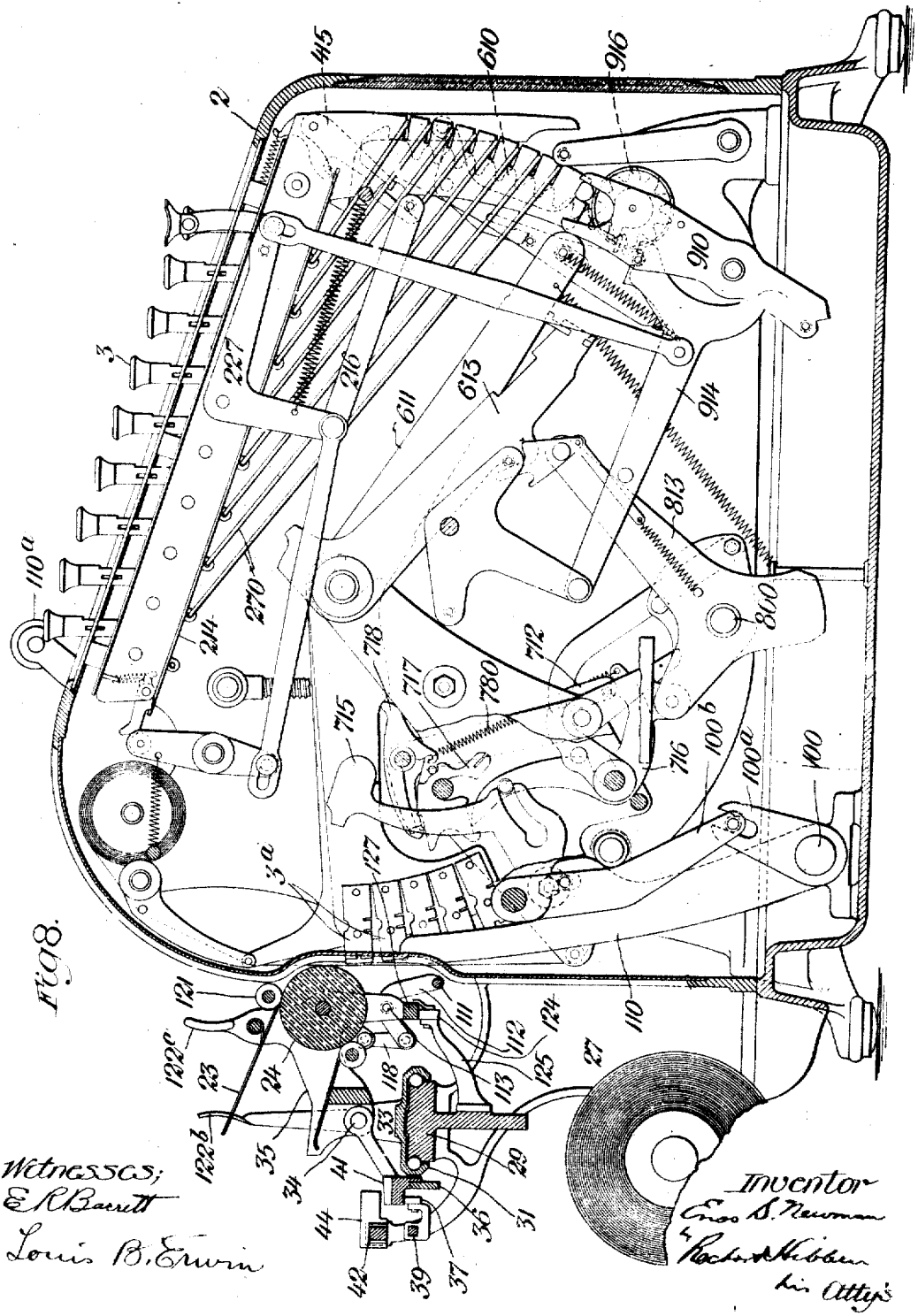
Figure 9:
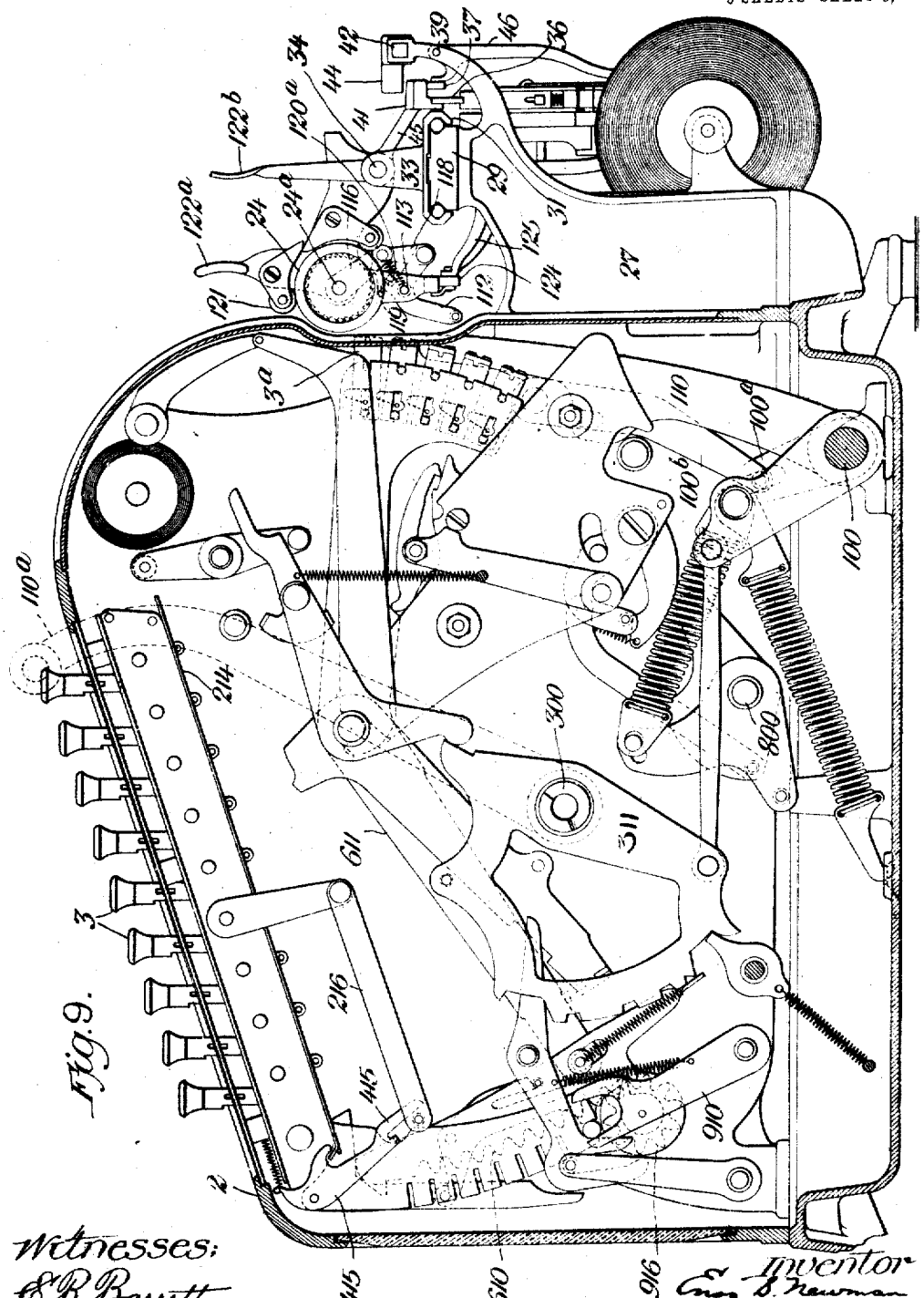

In the accompanying drawings which illustrate my invention in detail: Figure 1, represents a vertical sectional view of the plane cutting through the typewriting machine from front to rear as indicated by the broken line 1—1 of Fig. 2, the typewriter being in position in connection with the adding machine, the left side of the latter being shown in elevation. Fig. 2, represents a top plan view of the two machines, connected, the adding machine having its right side broken away and the middle portion of the top of the typewriting machine being broken out. Fig. 2ª, represents a perspective view of the handle of the carriage return lever, detached. Fig. 3, represents a rear elevation partly broken away of the adding and typewriting machines connected together for conjoint operation, parts being broken away. Fig. 4, represents a side elevation as seen from the left side of the two machines, operatively connected. Fig. 5, represents, in perspective, the left hand end of the carriage of the combined machines, the ends of the rack being broken away and a portion of the rack being broken out near the right hand end to expose the rock-bar and rack-supporting rollers, the knob on the left hand end of the roller (or platen) spindle being broken off and moved to the left. Fig. 6, represents a view of the left hand end of the carriage, showing the parts in their normal or printing position, in full lines, and thrown back, in dotted lines, the position of the type of the adding machine, and consequently the printing point of the typewriting machine, being also indicated in dotted lines. Fig. 7, represents on an enlarged scale, in perspective, the feeding mechanism of the carriage, the end being broken away to shorten the figure. Fig. 8 represents the adding machine in left side elevation with its inclosing casing in section as also the special paper carrying equipment at the rear which adapts the adding machine for combined use with the typewriting machine; certain cross rods, shafts and studs likewise appear in section the left hand supporting frame piece being omitted. Fig. 9 is a right side elevation of the combined machine, the adding casing being in section and the right hand supporting side frame omitted.

Like numerals indicate the same parts wherever they appear in the several figures of the drawing.

Referring to the drawings by numerals 1 (Figs. 1, 4, and 6) indicates the left hand side of the case of an adding machine, the top of the case and 3 the keys of the key-board and 3ª, the type in dotted lines (Fig. 6) of such machine (see also Figs. 9 and 10). In this instance I have illustrated an adding machine of a well known construction, as before referred to.

On account of the complete disclosure contained in prior patents above referred to it will not be necessary to describe in detail the adding machine proper in all its departments though some of the standard parts will be specially pointed out. The keys 3 before mentioned operate to draw rearward stop rods or wires 270 which variously limit descent of racks 610, the latter mounted through slot pin and spring connections on the forward ends of levers 611 upon whose rear ends are slidingly mounted the before mentioned type 3ª spring held rearward as indicated in Fig. 10. An oscillatory frame or yoke 613 normally upholds the forward ends of the levers 611 depressing the rear ends thereof so that the type are below the printing line. Descent of the forward ends of the levers is regulated by the setting of stop wires 270 or as determined by backward rotation of accumulator wheels as in totaling, causes the proper type to rise to the printing line. Besides setting the stop wires 270 the keys 3 when depressed slide rearward certain strips 214 engaged with latches 415 the latter normally underlying shoulders on the racks. A bail 216 also engages the latches and is operated by the total bell crank lever 227 so as to release all the latches in the case of taking a total. The accumulator pinions are designated 916, the same being supported in a rocking frame 910 and normally in mesh with the racks 610 as shown in Fig. 9. A pitman 914 normally engages a stud on the frame 910 above its rocking center and at the outset of an operation this pitman is thrust forward disengaging the pinions from the racks so that the latter will drop without affecting the accumulator. Before the racks are started upward in the last half cycle of operation of the machine the pitman is thrust rearward reëngaging the pinions with the racks. When a total is to be taken the bell crank lever 227 is operated and through the medium of a link 911 depresses the forward end of the pitman 914 so as to prevent disengagement of the pinions 916 from their racks during the first half cycle of operation. If the total after being printed is to be retained said bell crank lever is released at the end of this first half cycle of operation so that the pinions remain engaged with the racks. If on the other hand the accumulator is to remain at zero to which condition it has been brought by descent of the racks in mesh with the pinions, then the bell crank lever is not so released and the pitman 914 having become engaged with a stud on the frame 910 below the latter's rocking center will in moving rearward at the beginning of the last half cycle of operation disengage the pinions from the racks. The type 3ª will be driven rearward to do the printing by the impact against them of hammers 715 slotted for engagement with studs on driving levers 716, the latter connected by springs 780 with pawls 718 which operate upon latches 717 normally positioned to restrain said driving levers 716, all as shown in Fig. 9. Normally the driving levers and hammers are retracted by an oscillatory bail 712 but during the first half cycle of operation this bail retreats leaving the hammers restrained by the latches 717. The pawls 718 are carried by a swinging bail which moves forward during the first half cycle of operation and causes the pawls to displace the latches 717 wherever type carriers have risen far enough to present digit type at the printing line. Otherwise pawls are displaced by contact of their tails against shoulders of the type carriers. Referring to Fig. 10, 300 designates the rock shaft to which the operating handle is attached, said shaft carrying a full stroke sector 311 operatively connected to a rock shaft 100 at the rear of the machine. The latter as shown in both Figs. 9 and 10 has a short slotted crank arm 100ª engaged with a stud on a depending arm 100ᵇ swung from the frame-work and having a slot and pin connection with the line spacing or feed arm 110 so as to oscillate the same with effects such as hereinafter described.

The key-board, and in fact all of the mechanism of the typewriting machine except the carriage, is in this instance located to the left of the adding machine and close to the side 1 of the case thereof, as best shown in the plan view represented in Fig. 2. Of the typewriting machine, the top is indicated at 4 and the keys of the key-board at 5, the keys 3 and 5, of both machines, being also marked with letters and characters such as will appear in the machine when set up for practical use. The carriage or paper support of the typewriting machine is arranged to travel laterally, in this instance behind both machines, the typewriting machine being of the "front strike type," for the reason that in the type of adding machine illustrated the printing point is in the rear, but it will readily be understood by those familiar with the art that the position of the carriage may be changed to suit the style of adding machine used.

Inasmuch as the mechanism for making the typewriting impressions consists of as many separate trains of devices as there are keys, the description of one of such trains, leading from a single key, as for instance key "A" of the typewriting machine, will be deemed sufficient for a full understanding of the operation of all of the keys and their connection to the type. In such a train of printing devices, the stem 6 of the key is slidably mounted in the top or key-board of the case and has a laterally projecting pin 7 playing in a notch 8 in the horizontal arm of an elbow lever 9 pivoted at its angle 10 and having the lower end of its vertical arm connected by a wire or rod 11 with a movable reed-bar 12 pivoted at its lower end on a horizontal axis 13. Intermediate the connection between the wire 11 and the pivotal axis 13, on the reed-bar, is pivotally connected a link 14, the opposite end of which is connected similarly to a multiplying lever 15 of elbow shape pivoted at its angle 16 to a fixed part of the frame and normally held with the lower end of its vertical arm forward by a spring 17 connecting the end of its horizontal arm with a rigid part of the frame. The lower end of the multiplying lever 15 is connected by a rod 18, provided with a length-adjusting turnbuckle 19, with the short arm 20 of a type bar 21 pivoted at 22 and provided at its upper end with the usual type, in this train the type being "A", the same as the letter on the key.

When the key is depressed the elbow lever 9 is rocked, drawing wire or rod 11 and upper end of reed-bar 12 forward and with them the lower end of multiplying lever 15 and short arm 20 of type-bar 21, causing the latter to rock on its pivot 22, thus throwing the type up and making an impression on the paper 23 held in position on the roller or platen 24, the type striking in the horizontal line of the printing point of the adding machine and to the left thereof at a distance depending upon the position of the carriage by which the platen or roll is carried.

The upper end of the reed-bar 12 is cut out to leave projections 25, which by impact with a cross rod 26 serve as stops to limit the movement of the reed-bar on its pivot, thus, also, limiting the downward movement of the keys. I use the term "multiplying" with reference to lever 15, because by reason of the position of the connecting link 14 with reference to its fulcrum at 16 and the point of connection with rod 18, the latter, and consequently the type-bar, are caused to move through a greater space than the link 14 is impelled by the reed-bar, thus permitting of a shorter downward stroke of the keys. It will be obvious however, that the rod 18 might be connected directly with the reed-bar 12 if desired, but this arrangement would require a very much longer downward stroke of the keys. The described train of impression mechanism is most clearly shown in Fig. 1.

27 indicates brackets projecting rearwardly and upwardly from the back of the machine and carrying a track 29 upon which is mounted, on ball-bearings 30, the carriage 31, the balls being held in position by screws 32 (see Fig. 6), the track, and consequently the carriage, lying in a horizontal plane adjacent to the rear, or that face of the machine in which the printing point is located. Upon the carriage 31 are brackets 33 which, by pivots 34, carry the end plates 35 in which the platen or roll 24 is journaled, and which support other mechanism to be hereinafter mentioned.

36 indicates a rack in the rear of the carriage, the teeth of which point downward, said rack resting on rollers 37 journaled in brackets 38 mounted on a rocking bar or shaft 39 parallel with the rack and pivoted on its longitudinal axis in brackets 40 projecting rearward and upward from the track supports. Upon the upper face of the rack 36 is a lug 41. The brackets 40 are extended above the journals of the rocking bar 39 and in their upper ends carry a bar 42 (which I denominate the tabulating rail) provided on its front and rear edges with graduated notches 43 to receive an adjustable stop or pawl 44 which, when the rack 36 is in its upper position, will engage the lug 41 and stop the travel of the rack at any predetermined point to which the stop 44 has been adjusted. The rack 36 is mounted in the ends of bars 45 swinging from the pivots 34 and its normal position is such as to permit the lug 41 to pass under stop 44, but to raise it up so that the stop will be in the path of the lug the rock-bar 39 is provided with a pendent lever-arm 46 connected by rod 47 with a lever 48 pivoted at 49 to the inside of the front of the case of the machine and provided with a push key or bar 50 at its upper end projecting through the front of the machine (Fig. 4). When the bar or key 50 is pushed inward the lever arm 46 is pulled forward, the rock-bar turned and the rack thrown up to bring the lug 41 in the path of the stop 44. This mechanism is best shown in Fig. 4, and is only intended for use to permit the operator to quickly shift the carriage to a predetermined point, the usual longitudinal feed of the carriage to the left being accomplished by means of a spring (not shown) in a drum 51 (see Fig. 5) connected to the carriage by a cord 52, such feed taking place when the rack is in its lower or normal position and being governed by an escapement, the teeth 53 of which alternately engage each successive tooth (see Fig. 7). This escapement is operated in the well known manner to feed the rack one step after each impression of a type, the movement forward of the reed-bar 12 carrying with it the transverse bar 54ª at the upper end of the vertical arm of an elbow lever 54 pivoted at its angle on axis 13 and having a lateral projection 55 on its horizontal arm which engages under and raises the inner arm of a lever 56 whose upwardly bent inner end 57 operates an elbow lever 58 which, in turn, through the medium of a rod or link 59 connecting it with a lever 60 pivoted on the bar 61, oscillates said lever 60 and bar 61 and throws rearward the arm 62 which carries the teeth of the escapement, thus moving the teeth alternately in and out of engagement with the teeth of the rack and permitting the rack to be moved one space to the left as ordinarily done in typewriting machines.

The escapement arm is mounted on one end of the bar 61 longitudinally arranged with reference to the rack and carriage and extending an indefinite length, being pivoted in brackets 64 projecting rearward from the track frame and this bar is provided with a sliding dog 65 held in its normal position near the escapement arm 62 by a spring 66. A bracket 67 projects downwardly from the sliding dog and thence horizontally forming a point of attachment 68 for one end of a strap 69 which passed along one side of the bracket, in vertical alinement with the center of the bar 61, to a drum 70 pivoted on one side of the frame support and connected, by a rod 71, to a lever 72 of the third kind, pivoted at 73 to the frame and connected by a sliding joint as at 74 (see Fig. 1) with a lever 75 of the second kind, pivoted at its lower end to the frame at 76 and passing up above the top of the machine, as at 77, to within easy reach of the operator. By pulling this lever toward the operator the sliding dog 65 will engage the teeth of the rack 36 and as the dog slides on the bar will carry the carriage with it until the dog strikes a stop 78 on the bar 61 previously set, by aid of graduated marks on the bar, to suit any class of work to be done. In this movement the dog distends the spring 66 which draws the dog and operating means back to their normal position when released. This will enable the operator to shift the carriage quickly to the right without the inconvenience of reaching over the top of the machine. Should the operator desire to draw the carriage farther, or even all the way across, it will only be necessary to repeat the movement of drawing the lever 75 forward and releasing it until the desired position is reached.

The upper end of the lever 77 is provided with a spring pawl 77ª having a tooth 77ᵇ as shown in Figs. 1 and 2ª, said tooth being adapted to engage in any one of a graduated series of notches 77ᶜ, see Fig. 2, to hold the lever in any adjustment. To disengage the tooth 77ᵇ from notches 77ᶜ it is only necessary to squeeze the pawl 77ª against the upper end of the lever 77 when the latter will be free to be moved in either direction.

The escapement arm 62 is provided at its upper end with a pivoted tooth 62ª held upright by a spring 62ᵇ, while the upper end of the dog 65 is similarly pivoted and held upright by a spring 65ª, there being also provided a sliding tooth 65ᵇ in the part 65, normally held up by a spring 65ᶜ. By this means the teeth 62ª and 65ᵇ will both yield and slip over the teeth of the rack when moved to the left but will rigidly engage and move the rack when moved forward.

The usual space key 79 of the typewriting machine is mounted on a long key bar 80 secured pivotally at its lower end to the front end of lever 56ª at 81, Fig. 1, this end of lever 56ª being normally held up by a spring 82. The lever 56ª is pivoted on axis 13 and, on its end, beyond the pivot, has a horizontal lug or projection 56ᵇ, engaging under the lever 56, so that the depression of the space key 79 operates the escapement as is usual.

The lever 54 is connected at its upper end by a link 83 to a long pawl lever 84 centrally pivoted at 85 to the frame, whereby every forward movement of the lever 54 by the depression of a key will cause one of the two spring-pressed pawls 86 and 87, pivoted respectively to the upper and lower ends of pawl lever 84, to slip over one or more teeth of one of the ratchet wheels 88, 89, on shafts 90, 91, on which are secured spools 92 to which the opposite ends of the inking ribbon 93 are secured. This ribbon passes around suitable guides in front of the printing point on the paper and when the key is released the pawl-lever 84 will be drawn back to its normal position, and the active pawl engaging the teeth of its ratchet wheel will cause a partial revolution of its shaft and a corresponding winding of the ribbon on the spool of that shaft. The ratchet wheels 88 and 89 are not in the same vertical plane and the shafts 90 and 91 are slidable longitudinally, being operated by the keys 94, 95, on opposite ends of a lever 96 pivoted to the frame at 97, see Fig. 4. When one of these keys 94, 95, is pressed inward it slides one ratchet wheel into engagement and the other out of engagement, with its pawl, and every movement backward of the engaged pawl causes a winding of the ribbon one step upon the corresponding shaft and when the other key is depressed the active pawl becomes inactive and vice versa and the movement of the ribbon is reversed, it being moved in the opposite direction. The spools are each provided with a tension device, as at 98, 99, to prevent unnecessary rotation and to thus hold the ribbon taut at all times.

In the plates 35 which are pivoted at 34 to brackets 33 as before stated, is journaled the shaft 24ᵃ of the platen 24, the platen being rigidly secured to its shaft and the latter provided with ratchet wheel 100. On the shaft 24ᵃ is pivoted an elbow lever 101 whose vertical arm at its upper end is laterally bent at 102 over the ratchet wheel 100. In this arm is pivoted a pawl 103 the point of which is normally spring pressed into engagement with the ratchet wheel teeth. When this pawl is moved in the direction of its point the ratchet wheel and platen will move correspondingly, but when moved in the opposite direction the point of the pawl will slip over the teeth, causing no movement thereof. To effect the upward movement of the paper an elbow-handle-lever 104 is pivoted at 105, has its inner end 106 over the elbow lever 101, is normally pressed away from the latter by a spring 106 and has such backward movement limited by a set screw 107. When handle 104 is moved to the right its arm 106 will press down on elbow lever 101 causing the upward movement of the paper on the platen, such movement being limited by stops 108 and 109 (see Fig. 5). This movement is for the purpose of manually feeding the paper on the platen upward.

The regular feed of the paper upward after the printing of each line by the adding machine is effected by a lever 110 of the adding machine, being the same lever which effects the upward feed of the paper in the adding machine, when not combined with the typewriter.

It will be understood that in the combined typewriting and adding machine the same carriage or support or platen suffices for both machines, the carriage of the adding machine being removed when the typewriting machine is connected up or combined with it.

When the adding machine lever 110ᵃ is operated the pivot lever 110 connected therewith is impelled backward and strikes a bar 111 carried at the outer ends of arms of elbow levers 112 at opposite ends of the carriage, pivoted at 113 and each provided with a projection 114 through which a set screw 114ᵃ passes to engage a stop lug 115 and adjustably limit the movement of paper feed mechanism. On shaft 24ᵃ adjacent each ratchet wheel 100 is pivoted a lever 116 which at its outer end 117 is pivotally connected to a link 118 and on the same pivot is a pawl 119 held by a spring 120 in engagement with the ratchet wheel. The other end of each link 118 is pivotally connected to the associated elbow lever 112 so that the lever 116 and link 118 act as a toggle joint during the forward movement of pawl 119 under impulse of spring 120ᵃ to restore the elbow lever 112 after its retraction by the arm 110, said spring 120ᵃ being hooked at opposite ends over pivot studs 117 and 113. It will be seen that when the feed arm 110 swings rearward the pawls 119 ride over the pawls of the ratchet wheels and then when said feed arm or lever moves forward these pawls turn the ratchets and platen to advance the paper, the feed of the latter thus automatically accompanying the operation of the adding machine.

121, indicates the usual paper pressure rolls pivoted in and operated by elbow lever 122 and normally pressed against the platen by springs 123.

The elbow lever 122ᵃ is used to turn back the platen to inspect the work, and when the platen is forward, or down in its working position, a graduated bar 127 secured to end plates 35 rests and moves on a roller 124 mounted at the end of a bracket arm 125 secured to the track frame of machine opposite center of typewriter, as shown in Fig. 1, the pivot of said roller carrying a pointer 126 to indicate the position of the platen, by means of the graduated bar 127 before referred to.

The pivoted lever 122ᵇ is employed to raise the feed rack 36 off the escapement tooth.

The bar 127 and the rack 36 may be extended indefinitely, from where they are shown broken away in Fig. 5, to the left of the carriage to permit of extended movement of the carriage to the right.

From the foregoing it will be seen that I have combined, with an adding machine of the "Registering Accountants" class, typewriting means whereby an operator can insert a pay-roll, bill, or any paper, and print a name or any descriptive matter with the typewriting machine, beginning at any point or number on carriage scale, after which the carriage may quickly be shifted longitudinally so that any desired point or number on carriage scale will be opposite the printing point of the adding machine, and any desired figures being set up by depression of keys 3 of the adding machine and the operating handle of the latter pulled, the printing of said figures is effected by the usual printing mechanism of such adding machine, such figures forming a continuation of the line of printing done by the typewriting machine, as for instance in Fig. 5, "John Doe,_____19750".

It will be noted that the lever 75 and its connections operable by manipulation of the handle 77 as hereinbefore described, afford a ready means for returning the paper carriage to the right a predetermined distance to position the platen for receiving the amount imprint spaced a short distance from the typewritten matter as in the example of work appearing in Fig. 5.

It will be understood that during the operation of keys on the typewriter the escapement controlling the carriage operates and allows the carriage to move one step at a time as is common in all typewriters, but the carriage does not move when the adding machine is operated, the paper being automatically fed immediately after such operation of the adding machine mechanism by the rotation of the platen by means of the movement of lever 110, which action causes the paper to be fed the space of one line upward, thus dispensing with the necessity of doing this manually, as ordinarily done in typewriting machines. Manually operable mechanism is provided however, as before described, operated by lever 104, so that this feed may be accomplished independent of the adding machine.

While I have not shown type-bars carrying upper and lower case type, nor mechanism for shifting the carriage to adapt my typewriting mechanism to such type arrangement, it will be obvious to those skilled in the art that such mechanism can be readily adapted to my typewriting machine if so desired, and that any typewriting mechanism in which the printing center or point faces in the same direction when printing and is in alinement with the printing point of the adding machine, may be readily combined by slight modifications of the connecting and coöperating mechanism herein shown and described.

Having thus fully described my invention, what I claim as new, and desire to secure by Letters Patent of the United States is:

1. The combination with a commercially operable and complete typewriting machine, and a separate and distinct commercially operable adding machine, of a paper support common to both machines.

2. A combined machine, comprising a typewriting mechanism, and an adding and printing mechanism, having a separate key-board, in combination with a single paper support common to both machines.

3. A combined machine comprising a commercially operable and complete adding machine, a separate and distinct writing machine, and a single paper supporting carriage adapted to serve both machines.

4. The combination with a commercially operable and complete adding machine, and a separate and distinct writing machine, of means for detachably connecting the two together, and a paper support common to both machines.

5. A combined but separable machine, comprising an operable typewriting mechanism, in combination with a commercially operable adding and printing mechanism separable therefrom and independently operable, and having its printing points in line with that of the typewriting mechanism, and a single paper support for both machines.

6. A combined machine, comprising a frame, a typewriting mechanism mounted therein, and an adding and printing mechanism adjacent thereto, having a separate key-board, in combination with a single paper support for both mechanisms.

7. The combination of a supporting frame, an adding and listing tabulator mounted on said frame, a separate and distinct operable writing machine, and a paper support common to both mechanisms.

8. The combination of a supporting frame, an adding and listing tabulator mounted on said frame and embodying a separate series of keys for each denomination, a typewriting mechanism mounted on said frame, and a single paper support common to both mechanisms.

9. The combination of a supporting frame, an adding and listing tabulator mounted on said frame and embodying a separate series of keys for each denomination, a printing mechanism mounted on said frame for printing the amounts in columns, a key-operated typewriter mechanism on said frame for printing in connection with the amounts tabulated, and a single paper support for a sheet of paper upon which all the printing is done, substantially as described.

10. A combined but separable machine, comprising a commercially operable typewriting mechanism, in combination with an adding and printing mechanism separable therefrom and independently operable, and having its printing points apart from but in line with that of the typewriting mechanism, a paper carriage, and means for moving the same past both printing points.

11. A combined but separable machine, comprising a typewriting mechanism, and an adding and printing mechanism adjacent thereto, said machines being separable, and operable for their individual purposes whether separated or combined, and a single paper carriage adapted to serve both mechanisms when combined.

12. A combined but separable machine, comprising a typewriting mechanism, and an adding and printing mechanism adjacent thereto, said mechanisms being separable, and operable for their individual purposes whether separated or combined, and a single paper carriage adapted to serve both mechanisms when combined, or one mechanism when operated separate.

13. A combined machine, comprising a frame, a typewriting mechanism, an adding mechanism arranged to bring the printing points of both mechanisms in alinement, and a single paper carriage arranged to serve both mechanisms.

14. A combined machine, comprising a typewriting mechanism, a frame therefor, and adding mechanism, a frame therefor, all arranged to bring the printing points of both mechanisms in alinement, and a single paper support or carriage to serve both mechanisms, both mechanisms being operable for their individual purposes.

15. The combination with a typewriting machine, and an adding machine, of a paper carriage, a roller or platen thereon arranged to feed a sheet of paper to both machines, and means for rotating the roller operated by the printing mechanisms of the adding machine, substantially as described.

16. The combination with a typewriting machine, and an adding machine, of a paper carriage, a roller or platen thereon arranged to feed a sheet of paper to both machines, and means for rotating the roller operated by the printing mechanism of the adding machine, or manually, as desired.

17. The combination with a typewriting machine, and an adding machine, of a paper carriage, a roller or platen thereon arranged to feed a sheet of paper to both machines, manually-operated mechanism for rotating the roller, and automatic means for rotating the roller at the end of each line of printing.

18. The combination with a typewriting machine, and an adding machine, of a single platen roller, means for actuating it longitudinally past the printing points of both machines, and means for raising the roller at any point in the line of printing, substantially as described.

19. In a combined typewriting machine and adding machine, the combination with the printing mechanism of the two machines, of a paper roller or platen, mechanisms for moving it longitudinally past both printing points, and means for automatically rotating it after each operation of the adding machine, substantially as described.

20. In a combined typewriting machine and adding machine, the combination with the printing mechanisms of both machines, of a paper roller or platen, mechanism operated by the typewriting machine for moving the platen roller longitudinally past both printing points, and mechanism operated by the adding machine for rotating the platen roller at the end of each line, substantially as described.

21. In a combined typewriting machine and adding machine having printing mechanism, the combination of a single paper carriage, means for moving the carriage longitudinally during the operation of the typewriting machine, and means for holding the carriage stationary while the adding machine is operated, substantially as described.

22. In a combined typewriting machine and adding machine having printing mechanism, the combination of a single paper carriage, means (operated by the typewriting machine) for moving the paper carriage longitudinally in line with the printing points of both machines, and means for holding the carriage stationary while the adding machine is operated, substantially as described.

23. The combination with a typewriting machine provided with a suitable frame, a key-board and a printing point or center, of an adding and printing machine provided with a suitable frame, having a printing point or center, arranged adjacent to the typewriting machine with the two printing points or centers in alinement.

24. The combination with a typewriting machine provided with a suitable frame, a key-board and a printing point or center, of an adding and printing machine provided with a suitable frame, having a printing point or center, arranged adjacent to the typewriting machine with the two printing points or centers in alinement, and a single paper carriage arranged to serve both machines.

25. The combination with a commercially operable and complete typewriting machine, and a separate and distinct commercially operable adding machine, of a single carriage arranged to serve paper to both machines when arranged side by side.

26. In a combined typewriting and adding machine, the combination with the platen and its shaft, of a ratchet wheel upon the shaft, a bar or link pivoted on the shaft, a second bar or link, a pin passing through the adjacent ends of both links, a spring pressed pawl on the connecting pin and engaging the teeth of the ratchet wheel, an elbow lever pivoted at its angle and having one arm pivotally connected to the end of the second link, and means operated by the printing mechanism of the adding machine to oscillate the elbow lever, substantially as described.

27. In a combined typewriting and adding machine, the combination with the platen, its shaft and the ratchet wheel on the shaft, of a pawl engaging the ratchet wheel, toggle levers connected with the pawl, an elbow lever connected with the toggle levers, means operated by the printing mechanism of the adding machine for operating the pawl to move the toggle levers in one direction, and a spring to actuate the toggle levers in the opposite direction, substantially as described.

28. In a combined typewriting and adding machine, the combination with the platen, its shaft, a ratchet wheel on the shaft and a pawl engaging the ratchet wheel, of an elbow lever pivoted to the carriage, a transverse rod connected to one arm of the elbow lever, a lever or arm actuated by the printing mechanism of the adding machine adapted to strike said transverse rod for oscillating the elbow lever, and connections between the other arm of the elbow lever and the pawl whereby the movement of the elbow lever is communicated to the pawl, substantially as described.

29. In a combined typewriting and adding machine, the combination with the platen roll and means for feeding it longitudinally, of ratchet mechanism for rotating the roll, of a lever actuated by the printing mechanism of the adding machine, and operating the ratchet mechanism of the roll to rotate the roll one step at the finish of each printed line, substantially as described.

30. The combination with an adding and printing machine, of an independent typewriting mechanism adjacent thereto, and a carriage common to both machines adapted to carry paper from one machine to the other upon which to print in alinement by both machines.

31. The combination with an adding and printing machine, and an independent typewriting mechanism having its printing point or center in alinement with that of the adding and printing machine, of a paper carriage or support common to both machines arranged to feed the paper in such alinement.

32. The combination with an adding and printing machine, and an independent typewriting machine, the printing points or centers of the two machines being apart but in alinement with each other, of a paper carriage, and means for moving it past the printing points of both machines.

33. The combination of a typewriting machine, an independent adding machine arranged to print rows of figures at a point distant from that of the printing point of the typewriting machine, and a paper carriage arranged to feed a sheet of paper to the printing points of both machines.

34. The combination with a typewriting machine and an adding machine, each having separate printing points in line with each other, of a single paper carriage, and means for moving it in line with and past both printing points, substantially as described.

35. The combination with a typewriting machine, and an independent adding and printing machine, each having a separate and distinct printing point, of a single paper carriage, and means for moving the same longitudinally in line with and past the printing points of both machines.

36. The combination with a typewriting machine and its paper carriage, of an independent adding machine having its printing points apart from but in line with that of the typewriting machine, and means for feeding the carriage in the line of and past both printing points.

37. The combination with an adding and printing machine having a key-board and printing center, and a typewriting machine adjacent to the adding machine and having a separate key-board and printing center, of a paper support or platen, and means for shifting the platen to the separate printing points of the two machines.

38. The combination of an adding machine having a suitable frame, key-board and printing center, and a typewriting machine having a separate key-board and printing center, of a paper support, means for moving it past the printing centers of both machines, and means for oscillating the paper at each operation of the adding machine.

39. The combination with an adding and listing machine, and a typewriting machine, of a single paper support serving both machines, and means for raising, lowering and shifting the paper support to the printing points of the two machines.

40. The combination of a commercially operable adding and listing machine, and a separately operable typewriting machine adjacent thereto, of a paper support or platen common to both machines, a movable lever of the adding machine, and a transverse pivoted rod actuated by said lever at each operation of the adding machine to cause the paper to oscillate and hold it rigid during the printing operation of the adding machine.

41. The combination with a typewriting mechanism and an adding mechanism, of a paper carriage, a roller or platen thereon arranged to feed a sheet of paper to both mechanisms, and means for rotating the roller operated by a part of the adding mechanism, substantially as described.

42. The combination with a typewriting mechanism, and an adding mechanism, of a paper carriage, a roller or platen thereon arranged to feet a sheet of paper to both mechanisms, and means for rotating the roller operated by a part of the adding mechanism, or manually, as desired.

43. The combination with a typewriting mechanism, and an adding mechanism, of a paper carriage, a roller or platen thereon arranged to feed a sheet of paper to both mechanisms, manually-operated mechanism for rotating the roller, and automatic means for rotating the roller at the end of each line of printing.

44. In an adding machine, a platen, tpye-carriers, type mounted in frames on the carriers, devices for operating the carriers adjacent to the platen, hammers for driving the type against the platen to print numbers, and mechanism operable to accumulate the numbers so printed, in combination with mechanism operable to print any desired words on the platen in alinement with the printed numbers, substantially as specified.

45. In an adding and writing machine, a platen, mechanism operable to print any desired words thereon, type-carriers movable adjacent to the platen, movable type carried by said carriers, hammers for driving the type against the platen to print in alinement with the words, and devices operable to rotate the platen when the type-carriers operate, substantially as described.

46. In an adding and writing machine, a platen, typewriting mechanism operable to print any desired words thereon, devices carrying movable type for printing numbers, means for moving said devices adjacent to the said platen, hammers mounted in position to drive the type against the platen, and means for striking the hammers against the type when the type has been positioned for printing, substantially as specified.

47. In an adding and writing machine, a platen, movable devices carrying type, and hammers for driving the type to record on the said platen, in combination with type-bars, and keys for operating them to print on the platen aforesaid, substantially as specified.

48. The combination of the platen, typewriting mechanism operable to print any desired words thereon, devices independent of the typewriting mechanism movable adjacent to the said platen, type carried by said devices, and hammers for driving the type against the platen aforesaid, substantially as specified.

49. In an adding and writing machine, word printing mechanism having a platen, type-carriers separate from the word printing mechanism, and hammers for driving the type in the carriers to print on the platen aforesaid, substantially as specified.

50. In an adding and writing machine, word printing mechanism having a platen, type-carriers separate from the word printing mechanism, type in said carriers, hammers for driving the type to print on the platen aforesaid, and devices for drawing the hammers away from the type after operation, substantially as set forth.

51. In an adding and writing machine, word printing mechanism having a platen, type-carriers separate from the word printing mechanism, devices for operating the type-carriers, hammers for driving the type to print numbers on the platen aforesaid and totalizing mechanism operable to totalize the numbers so printed.

52. In an adding and writing machine, the combination with the word printing mechanism having a platen arranged to carry paper, of devices carrying type independent of the word printing mechanism, means for moving said devices toward the platen as required for printing numbers thereon, means for printing the number by use of the type after said devices have been so moved, and a totalizer operable to add the numbers as printed.

53. In an adding and writing machine, the combination with the word printing mechanism having a platen arranged to carry paper, of devices carrying type independent of the word printing mechanism, means for moving said devices to printing position adjacent to the platen as required for printing numbers, means for recording after said devices stop adjacent to the platen, a totalizer, and means for operating the same after each number has been recorded.

54. The combination with word printing mechanism having a platen arranged to carry paper, of type-carriers separate from the word printing mechanism, a series of relatively movable types carried by each type-carrier, means for moving the type-carriers toward the platen, stops to limit movement of the type-carriers, and hammers for driving the type to print, substantially as specified.

55. The combination with word printing mechanism having a platen arranged to carry paper, of devices carrying type independent of the word printing mechanism, means for alining any desired type carried by the said devices adjacent to the platen aforesaid, means for driving the type so alined against the said platen to print, and automatic means for rotating the platen after the type has been driven to print, substantially as specified.

56. In a machine of the character described, word printing mechanism having a platen arranged to carry paper, adding mechanism, type-carriers separate from the word printing mechanism, a series of relatively movable type carried by each of said type-carriers, means for alining any desired type on the type-carriers adjacent to the platen aforesaid, means for driving the type so alined against the said platen to print numbers, and means for operating the adding mechanism to add the numbers so printed, substantially as specified.

57. The combination of a typewriting machine provided with a frame and with impression means, an adding machine provided with a frame and with impression means, a carriage rail means rigidly connected to the frames of the respective machines and a platen carriage mounted to move on said rail means into coöperative relation with the impression means of either of the machines.

58. The combination with a supporting frame, of a typewriting mechanism thereon, an adding mechanism also mounted upon said frame and having printing means coordinated with the adding mechanism and independent of the typewriting mechanism, to print individual amounts as the same are accumulated, and a single paper support for both the typewriting mechanism and the printing means of the adding mechanism.

59. The combination with a supporting frame, of a typewriting mechanism thereon, an adding mechanism also mounted upon said frame and having printing means coordinated with the adding mechanism and independent of the typewriting mechanism, to print individual amounts as the same are accumulated, and a platen carriage common to the typewriting mechanism and the printing means of the adding mechanism.

60. The combination with a supporting frame, of a typewriting mechanism thereon, an adding mechanism also mounted upon said frame and having printing means coordinated with the adding mechanism and independent of the typewriting mechanism, to print individual amounts as the same are accumulated, and carriage rail means coextensive with the typewriting mechanism and the printing means of the adding mechanism, and a platen carriage movable on said rail means.

61. The combination of typewriting mechanism, adding and printing mechanism, a paper support serving both mechanisms and having line spacing mechanism, and means for actuating the line spacing mechanism as an incident to the operation of said adding and printing mechanism.

62. The combination of typewriting mechanism, adding and printing mechanism, a paper support serving both mechanisms and having line spacing mechanism, means controlled by the adding and printing mechanism for automatically operating the line spacing mechanism, and means for manually operating such latter mechanism.

63. The combination of typewriting mechanism, adding and printing mechanism, a paper carriage and platen adapted to serve both mechanisms, and means controlled by said adding and printing mechanism for rotating the platen for line spacing.

64. The combination of typewriting mechanism, adding and printing mechanism, a transversely movable paper carriage having a platen serving both mechanisms, and line spacing mechanism coöperating with the platen and arranged to be actuated in any position of the carriage as an incident to the operation of said adding and printing mechanism.

65. The combination of typewriting mechanism, adding and printing mechanism, a transversely movable paper carriage having a platen serving both mechanisms, line spacing mechanism coöperating with the platen, and a bail for operating such line spacing mechanism and arranged to be actuated by a moving part of the adding and printing mechanism.

66. The combination of typewriting mechanism, adding and printing mechanism, a transversely movable paper carriage having a platen serving both mechanisms, line spacing mechanism coöperating with the platen, and means actuating the line spacing mechanism upon the operation of the adding and printing mechanism for advancing the platen after the operation of such latter mechanism.

67. The combination of typewriting mechanism, adding and printing mechanism, a transversely movable paper carriage having a platen serving both mechanisms, line spacing mechanism coöperating with the platen, and means controlled by the adding and printing mechanism for actuating the line spacing mechanism after the operation of such former mechanism.

68. The combination of typewriting mechanism, adding and printing mechanism, a transversely movable paper carriage having a platen serving both mechanisms, line spacing mechanism coöperating with the platen, and a bail extending longitudinally of the carriage and adapted to be actuated by a moving part of the adding and printing mechanism in any position of the carriage.

69. The combination of typewriting mechanism, adding and printing mechanism, a transversely movable paper carriage having a platen serving both mechanisms, line spacing mechanism coöperating with the platen, and an oscillating arm movable at every operation of the adding and printing mechanism for operating the line spacing mechanism.

70. The combination of typewriting mechanism, adding and printing mechanism, a transversely movable paper carriage having a platen serving both mechanisms, line spacing mechanism coöperating with the platen, a bail operatively connected with such line spacing mechanism, and an oscillating arm movable at every operation of the adding and printing mechanism for actuating the bail and thereby operating the line spacing mechanism.

71. The combination with "front strike" typewriting mechanism, and an adding machine having printing devices "front strike" in alinement with the typewriting mechanism and adapted to print individual amounts, independently of the typewriting mechanism, as such amounts are accumulated, of a paper support serving both the typewriting mechanism and said printing devices of the adding machine to receive their impressions.

72. In a combined typewriting machine and adding machine, the combination with said machines of a single paper carriage adapted to serve both machines, and escapement mechanism for said carriage under the control of the typewriting machine only for a step-by-step movement of the carriage when the latter machine is operated.

73. The combination of typewriting mechanism, adding and printing mechanism, a platen arranged to serve both mechanisms and capable of longitudinal adjustment and of rotary adjustment, said longitudinal adjustment being controlled by the typewriting mechanism and the rotary adjustment by the adding and printing mechanism.

74. In a combined typewriting machine and adding machine, the combination, with said machines, of a transversely movable paper support common to both machines and adapted to receive impressions therefrom, typewriter escapement mechanism applied to said paper support, and manually operated means for causing continuous movement of the support from one columnar position to another.

75. In a combined typewriting machine and adding machine, the combination, with said machines, of a transversely movable paper support common to both machines and adapted to receive impressions therefrom, escapement means controlled by the typewriting machine for the step-by-step transverse movement of the support for letter spacing, and manually operated means for causing continuous movement of the support from one columnar position to another.

76. In a combined typewriting machine and adding machine, the combination, with said machines; of a transversely movable paper support common to both machines and adapted to receive impressions therefrom, means controlled by the typewriting machine for the step-by-step transverse movement of the support for letter spacing, line spacing mechanism coöperating with the support and controlled by the adding machine, and manually operated means for shifting the support transversely to different columnar positions.

77. The combination of a typewriting machine, an adding machine having amount printing means coördinated with its adding mechanism to list individual items as accumulated, and a transversely movable paper support adapted to serve both machines, the typewriting machine and the printing devices of the adding machine being arranged side by side with printing points in alinement.

78. The combination of a typewriting machine, an adding machine having amount printing means coördinated with its adding mechanism to list individual items as accumulated, and a transversely movable paper support located rearwardly of said machines in position to receive impressions from both, the typewriting machine and printing means of the adding machine being of the "front strike" variety and arranged side by side.

79. The combination of typewriting and amount printing mechanisms arranged side by side and separately operable; a laterally shiftable paper carriage common to both mechanisms, escapement devices operated by the typewriting mechanism to move the carriage step by step in typewriting, and means for returning the carriage to position it for receiving the amount-impression.

80. The combination of typewriting and amount printing mechanisms arranged side by side and separately operable, a laterally shiftable paper carriage common to both mechanisms, escapement devices operated by the typewriting mechanism to move the carriage step by step in typewriting, means for returning the carriage to position it for receiving the amount-impression and means operated by the amount printing mechanism for line-spacing the paper.

81. In a machine of the class described, the combination of a laterally shiftable paper carriage, line-spacing mechanism employing an oscillatory bar mounted on said carriage and extending lengthwise thereof, a prime mover, and a member reciprocated thereby and adapted to act against said bar in any lateral position of the carriage.

82. In a machine of the class described, the combination of a laterally shiftable paper carriage, line-spacing mechanism employing a swinging bail mounted on the carriage and having a cross bar extending lengthwise thereof, a prime mover, and a member reciprocated thereby and adapted to act against said bar in any lateral position of the carriage.

83. In a machine of the class described, the combination of a laterally shiftable paper carriage, line-spacing mechanism employing an oscillatory bar mounted on said carriage and extending lengthwise thereof, a prime mover, a member reciprocated thereby and adapted to act against said bar in any lateral position of the carriage, and a spring resisting movement of the bar by the said member.

84. In a machine of the class described the combination of a laterally shiftable paper carriage, line-spacing mechanism employing a swinging bail mounted on the carriage and having a cross bar extending lengthwise thereof, a prime mover, a member reciprocated thereby and adapted to act against said bar in any lateral position of the carriage, and a spring resisting movement of the bail by the said member.

85. In a machine of the class described, the combination of a laterally shiftable paper carriage, line-spacing mechanism comprising a ratchet wheel, a pawl, and an oscillatory bar operatively connected to the pawl, and extending lengthwise of the carriage, a prime mover, and a member reciprocated thereby and adapted to act against said bar in any lateral position of the carriage.

86. In a machine of the class described, the combination of a laterally shiftable paper carriage, line spacing mechanism comprising a ratchet wheel, a pawl, and a swinging bail operatively connected to the pawl and having a cross bar extending lengthwise the carriage, a prime mover, and a member reciprocated thereby and adapted to act against said bar in any lateral position of the carriage.

87. In a machine of the class described, the combination of a laterally shiftable paper carriage, line-spacing mechanism comprising a ratchet wheel, a pawl, and a swinging bail having a cross bar extending lengthwise the carriage and also having a projecting crank arm pivotally connected to the pawl, a prime mover, and a member reciprocated thereby and adapted to act against said bar in any lateral position of the carriage.

88. In a machine of the class described, the combination of a laterally shiftable paper carriage, line-spacing mechanism employing an oscillatory bar mounted on said carriage and extending lengthwise thereof, a prime mover, and an arm operatively connected to the prime mover and adapted to act upon the line space bar in any position of the paper carriage.

89. In a machine of the class described, the combination with printing mechanism and actuating means therefor which include an oscillating structure; of a laterally shiftable paper carriage, and line-spacing mechanism comprising an arm carried back and forth by the aforesaid oscillating structure, an oscillatory bar on the paper carriage extending lengthwise thereof and adapted to be acted upon by said arm in any lateral position of the paper carriage, and paper feed devices operatively connected to said bar.

90. In a machine of the class described, the combination with printing mechanism, and actuating means therefor comprising a reciprocating prime mover, an oscillating structure operatively connected thereto, and a spring applied to said oscillatory structure; of a laterally shiftable paper carriage, and line-spacing mechanism comprising an arm carried back and forth by the aforesaid oscillating structure, an oscillatory bar on the paper carriage extending lengthwise thereof and adapted to be acted upon by said arm in any lateral position of the paper carriage, and paper feed devices operatively connected to said bar.

91. In a machine of the class described, the combination with printing mechanism, a rock shaft and connections for operating said mechanism, and a spring applied to the rock shaft; of a laterally shiftable paper carriage, and line spacing mechanism comprising an arm connected to the rock shaft, an oscillatory bar on the paper carriage extending lengthwise thereof and adapted to be acted upon by said arm in any lateral position of the paper carriage, and paper feed devices operatively connected to said bar.

92. In a machine of the class described, the combination with printing mechanism, a rock shaft and connections for operating said mechanism, and a spring applied to the rock shaft; of a laterally shiftable paper carriage, and line spacing mechanism comprising an arm connected to the rock shaft, a swinging bail mounted on the paper carriage with its crossbar extending lengthwise thereof and adapted to be acted upon by said arm in any lateral position of the carriage, said bail having a crank arm; a pawl jointed to said crank arm; a spring applied to the bail to move the pawl in the opposite direction to that in which it is moved by the arm that connects with the rock shaft; and a ratchet wheel upon which the pawl acts to feed the paper.

Signed at Washington in the District of Columbia this seventh day of February A. D., 1901.

ENOS S. NEWMAN.

Witnesses:
ALFRED B. DENT,
ALFRED WOOD.

It is hereby certified that in Letters Patent No. 1,015,630, granted January 23, 1912, upon the application of Enos S. Newman, of Washington, District of Columbia, for an improvement in "A Combined Type-Writing and Adding Machine," errors appear in the printed specification requiring correction as follows: Page 1, after line 13, insert the following paragraph:

*In the present embodiment of my invention I have illustrated and described improved type-writing mechanism which will form the subject matter of another application for patent, in connection with an adding machine of the class known as "Registering Accountants" such for instance as those machines patented to W. S. Burroughs—especially patent No. 504,963, and dated September 12, 1893, and a special object of the invention is to provide means whereby type-writing mechanism of this, or ordinary construction, may be combined with such an adding machine.*

Page 1, strike out lines 14–16, and same page, line 21, as now numbered, after the period insert the sentence *Reference may be had to William S. Burroughs' patent No. 505,078 as to standard printing devices employed in these machines,*, and same page, line 101, after the word "adding" insert the word *machine;* and that the said Letters Patent should be read with these corrections therein that the same may conform to the record of the case in the Patent Office.

Signed and sealed this 5th day of March, A. D., 1912.

[SEAL.]

C. C. BILLINGS,

*Acting Commissioner of Patents.*